United States Patent Office 3,165,491
Patented Jan. 12, 1965

3,165,491
VINYLIDENE CHLORIDE POLYMER COMPOSITIONS HAVING IMPROVED LOW TEMPERATURE PROPERTIES
George J. Butzler, Carl P. Zupic, and George B. Sterling, Midland, Mich., assignors to The Dow Chemical Company, Midland, Mich., a corporation of Delaware
No Drawing. Filed June 13, 1962, Ser. No. 202,062
14 Claims. (Cl. 260—31.8)

This invention relates to polymeric compositions and, in particular, to polymeric compositions based on vinylidene chloride polymers and copolymers.

Polymers and copolymers of vinylidene chloride with such comonomers as acrylonitrile, vinyl chloride, and lower alkyl acrylates have found wide use as films for packaging of foodstuffs and other articles. Such films possess many useful properties, such as inertness, ability to be heat sealed, transparency, shrinkability, and low water vapor transmission rates, which are desirable for packaging foodstuffs. However, the prior vinylidene chloride polymer films suffered the disadvantage of becoming brittle and losing strength and other qualities at low temperatures. Prior art attempts to plasticize these copolymers have not generally been successful in overcoming those problems. The compatibility of liquid plasticizers with vinylidene chloride polymers is restricted which limits low temperature flexibility. Such liquid plasticizers also have a tendency to bleed out of the composition which is undesirable for packaging of certain foods.

Accordingly, it is a principal object of this invention to provide polymeric compositions based on polymers of vinylidene chloride which compositions retain their flexibility and other properties at low temperatures, such as are encountered in refrigerated foodstuffs and frozen foodstuffs.

It is a further object of the invention to provide polymeric compositions which have an advantageously low melt viscosity which facilitates the fabrication of films by extrusion and the like.

It is a further object of the invention to provide polymeric compositions which do not discolor on exposure to light.

It is a further object of this invention to provide polymeric compositions which are relatively impermeable to water vapor and other gases.

The polymeric composition of this invention comprises a blend of (I) from 70 to 95% by weight of the composition of a crystalline polymer consisting of (a) about 70 to 100% by weight of vinylidene chloride and (b) 0 to 30% by weight of at least one monoethylenically unsaturated comonomer and (II) from 5 to 30% by weight of the composition of a rubber-like copolymer consisting of (1) from 70 to 95% by weight of a conjugated diolefin and (2) 5 to 30% by weight of a lower alkyl-lower alkenyl-ketone.

The crystalline vinylidene chloride polymers usable in this invention are well known and may be prepared by interpolymerizing vinylidene chloride with known comonomers. Typical of the normally crystalline polymeric materials falling within the advantageous definition are the polymers and copolymers of at least 70% by weight of vinylidene chloride with the remainder composed of one or more other monoethylenically unsaturated comonomers exemplary of which are vinyl chloride, vinyl acetate, vinyl propionate, acrylonitrile, alkyl and aralkyl acrylates having alkyl and aralkyl groups of up to about 8 carbon atoms, acrylic acid, acrylamide, vinyl alkyl ethers, vinyl alkyl ketones, acrolein, allyl esters and ethers, butadiene and chloropropene. Known ternary compositions also may be employed advantageously. Representative of such polymers are those composed of at least 70% by weight of vinylidene chloride with the remainder made up of, for example, acrolein and vinyl chloride, acrylic acid and acrylonitrile, alkyl acrylates and alkyl methacrylates, acrylonitrile and butadiene, acrylonitrile and itaconic acid, acrylonitrile and vinyl acetate, vinyl propionate, or vinyl chloride, allyl esters or ethers and vinyl chloride, butadiene and vinyl acetate, vinyl propionate, or vinyl chloride and vinyl ethers and vinyl chloride. Quaternary polymers of similar monomeric composition will also be known.

The rubber-like copolymers which impart low temperature flexibility to the vinylidene chloride polymer are copolymers of (1) an open chain aliphatic conjugated diolefin having from 4 to about 9 carbon atoms, such as butadiene or isoprene, with (2) lower alkyl-lower alkenyl ketones, such as methyl isopropenyl ketone, ethyl vinyl ketone, and methyl vinyl ketone. The contemplated copolymers are rubber-like elastomers. Such elastomers have a Mooney viscosity at 212° F. of 10 to 140, preferably in the range of 30 to 70. The rubber-like copolymers are known and may be prepared by copolymerizing the monomers in aqueous emulsion as, for example, by the procedure disclosed in U.S. Patent 2,897,167.

The polymeric blends of the invention may include plasticizers, such as dioctyl phthalate, dibutyl sebacate, and the like, in the range of about 2 to 10% by weight of the composition. The polymers blend may also include antioxidants, light stabilizers, and other additives known in the art which do not deleteriously affect the properties of the film.

The polymer blends of the invention are preferably prepared by mixing latexes of the vinylidene chloride polymers and of the rubber-like copolymer in the proper proportions, coagulating the latex blend with alum or other known coagulants and recovery of dried polymer as is known in the art. The polymer blends are preferably extruded in tube form, stretched and oriented by the bubble technique and slit to form films as is known in this art. The compositions are useful in other processes, such as molding, slot extrusion, and other thermal fabrication techniques, to form films, fibers, foils, molded articles, and other forms having the superior properties.

The products of this invention will be illustrated with the following examples in which all percentages and parts are by weight.

EXAMPLE 1

A latex containing 34% solids of crystalline copolymer composed of 73% by weight vinylidene chloride and 27% by weight of vinyl chloride was prepared by emulsion polymerization, utilizing potassium persulfate as the catalyst and the dihexyl ester of the sodium salt of sulfosuccinic acid as the emulsifier in a manner well known in the art.

Several batches of rubbery latexes were prepared from 70% butadiene and 30% methyl isopropenyl ketone to form latexes having 46% solids content utilizing potassium persulfate as the catalyst and the dihexyl ester of the sodium salt of the sulfosuccinic acid as the emulsifier. To each latex there was added 1% based on latex solids of 2,4-dimethyl-6-(1-methylcyclohexyl)phenol as an antioxidant.

The vinylidene chloride latex and the rubbery copolymer latexes were blended in desired proportions, coagulated, and dried and the polymer blend recovered.

Unplasticized flow moldings were made from certain of the polymer blends. In one case 5% of dibutyl sebacate was added as a plasticizer. Samples of the unblended vinylidene chloride polymer were used as one comparison and unblended vinylidene chloride polymer plus 5% dibutyl sebacate as a further comparison. Flow moldings were also made of these samples in identical manner to the previously mentioned moldings.

Other samples of the polymer blends were thermally extruded using standard bubble techniques into oriented films having a thickness of 0.001 inch. In each case, dibutyl sebacate was employed as the plasticizer.

The following tables summarize the results of the physical properties determined on the moldings and the oriented films.

In Tables I and II, the physical properties of 73% vinylidene chloride–27% vinyl chloride copolymer plus various percentages of 70% butadiene–30% methyl isopropenyl ketone polymers are tabulated both with or without the addition of 5% dibutyl sebacate as a plasticizer. The column headed "Rubber Content" indicates the amount of the rubbery copolymer in the film.

*Table I*

MOLDINGS

| Sample No. | Rubber Content | Flexural Modulus, °C. | Second Point Transition, °C. |
|---|---|---|---|
| For comparison: | | | |
| 1 | None (Control) | +11.0 | −1.0 |
| 2 | Control+5% Plasticizer | −12.0 | −26.0 |
| This invention: | | | |
| 3 | 10% | −5.0 | −12.0 |
| 4 | 15% | −9.0 | −15.0 |
| 5 | 20% | −13.5 | −12.0 |
| 6 | 10%+5% Plasticizer | −30.0 | −35.0 |

In all of the tables of this example, the column headings have the following meanings:

Melt viscosity (poises): Expresses the flowability of a plastic at 180° C. and 237 lbs./in.$^2$ pressure between parallel platens at essentially zero shear rate.
Flexural modulus (° C.): The temperature at which the unplasticized molded strip possesses a modulus of 2.5×10$^{-5}$ lbs./in.$^2$ in flexure.
Percent transmission (T): Percent of visible range 4,000–8,000 A. transmitted through one mil oriented film.
ΔT: Degree of yellowness. Obtained from the difference of transmissions at 6200 A. and 4200 A.
O$_2$ transmission: CC. at STP/100 in.$^2$/24 hrs./mil at 1 atm. driving force.
WVTR: Water vapor transmission rate. Gms./100 in.$^2$/24 hrs./mil at 100° F. and 90% relative humidity.
Cold flex: Number of hand flexes at −18° C. (0° F.) to produce rupture.

Tables III and IV present data on physical properties of 73% vinylidene chloride–27% vinyl chloride modified with 10% butadiene-methyl isopropenyl ketone copolymer, both with and without 5% dibutyl sebacate as a plasticizer. The column headed "percent MIK" is the percentage of methyl isopropenyl ketone in the rubbery copolymer.

*Table III*

MOLDINGS

[10% rubber copolymer in blend]

| Sample No. | Percent MIK | Melt Viscosity (Poises×10$^3$) | Flexural Modulus, °C. |
|---|---|---|---|
| 9 | 15 | 182 | −1.5 |
| 10 | 20 | 210 | −0.5 |
| 11 | 25 | 185 | −2.5 |
| 12 | 30 | 170 | −5.0 |

*Table IV*

ORIENTED FILMS

[10% rubber copolymer + 5% dibutyl sebacate plasticizer]

| Sample No. | Percent MIK | Percent T Visible Range | ΔT Yellow | O$_2$ Trans. | WVTR | Cold Flex |
|---|---|---|---|---|---|---|
| 13 | 15 | 85.5 | 3.2 | 4.8 | 0.6 | 8 |
| 14 | 20 | 83.6 | 5.7 | 7.6 | 1.0 | 5 |
| 15 | 25 | 87.1 | 4.7 | 10.8 | 1.1 | 4 |
| 16 | 30 | 87.3 | 5.5 | 18.4 | 1.7 | 3 |

Tables V and VI present the physical properties of 73% vinylidene chloride–27% vinyl chloride modified with 15% of various rubbery copolymers, both with and without the addition of 5% dibutyl sebacate plasticizer.

*Table V*

MOLDINGS

[15% rubber copolymer]

| Sample No. | Percent MIK | Melt Viscosity (Poises×10$^3$) | Flexural Modulus, °C. |
|---|---|---|---|
| 17 | 15 | 240 | −1.5 |
| 18 | 20 | 340 | −8.0 |
| 19 | 25 | 220 | −13.5 |
| 20 | 30 | 190 | −11.0 |

*Table VI*

ORIENTED FILMS

[15% rubber copolymer + 5% dibutyl sebacate plasticizer]

| Sample No. | Percent MIK | Percent T Visible Range | ΔT Yellow | O$_2$ Trans. | WVTR | Cold Flex |
|---|---|---|---|---|---|---|
| 21 | 15 | 84.1 | 3.6 | 6.6 | 0.7 | 20+ |
| 22 | 20 | 82.6 | 6.9 | 11.7 | 1.1 | 20+ |
| 23 | 25 | 88.1 | 3.9 | 21.1 | 1.4 | 8 |
| 24 | 30 | 88.9 | 4.8 | 40.0 | 2.8 | 5 |

*Table II*

ORIENTED FILMS

| Sample No. | Rubber Content | Tensile Strength (p.s.i.) | | Elongation (percent) | | Tear Strength (grams) | | Percent Shrink | | Drop Impact −18° C., Kg. Cm./Mil |
|---|---|---|---|---|---|---|---|---|---|---|
| | | L | C | L | C | L | C | 100° C. | 85° C. | |
| For comparison: | | | | | | | | | | |
| 7 | Control+5% Plasticizer | 6,000 | 14,000 | 110 | 85 | 185 | 40 | 56 | 28 | 5.5 |
| This invention: | | | | | | | | | | |
| 8 | 10%+5% Plasticizer | 6,500 | 11,500 | 160 | 85 | 138 | ($^1$) | 45 | 28 | 12.8 |

$^1$ Would not tear.

Tables VII and VIII present data on physical properties of 73% vinylidene chloride–27% vinyl chloride copolymer modified with various percentages of a rubber copolymer of 80% butadiene–20% methyl isopropenyl ketone.

*Table VII*

MOLDINGS

[Vinylidene chloride copolymer + copolymer of 80% butadiene–20% MIK]

| Sample No. | Percent Copolymer | Melt Viscosity (Poises×10³) | Flexural Modulus,° C. |
|---|---|---|---|
| 25 | 0 | 180 | 8.0 |
| 26 | 5 | 195 | 7.0 |
| 27 | 10 | 210 | −0.5 |
| 28 | 15 | 340 | −8.0 |
| 29 | 20 | 310 | −13.5 |

*Table VIII*

ORIENTED FILMS

[Blends of Table VII + 5% dibutyl sebacate plasticizer]

| Sample No. | Percent copolymer | Percent T Visible Range | ΔT Yellow | $O_2$ Trans. | WVTR | Cold Flex |
|---|---|---|---|---|---|---|
| 30 | 0 | 89.5 | 2.9 | 3.8 | 0.5 | 1 |
| 31 | 5 | 83.8 | 7.1 | 4.4 | 0.8 | 2 |
| 32 | 10 | 83.6 | 5.7 | 7.6 | 1.0 | 5 |
| 33 | 15 | 82.6 | 6.9 | 11.7 | 1.1 | 20+ |
| 34 | 20 | 83.8 | 5.3 | 17.0 | 1.4 | 20+ |

Tables IX and X present the data on physical properties of 73% vinylidene chloride–27% vinyl chloride modified with various proportions of a rubbery copolymer of 70% butadiene–30% isopropenyl ketone, with or without 5% dibutyl sebacate as a plasticizer.

*Table IX*

MOLDINGS

[Vinylidene chloride copolymer + copolymer of 70% butadiene–30% MIK]

| Sample No. | Percent Copolymer | Melt Viscosity (Poises×10³) | Flexural Modulus,° C. |
|---|---|---|---|
| 35 | 0 | 180 | 8.0 |
| 36 | 5 | 165 | 3.5 |
| 37 | 10 | 170 | −5.0 |
| 38 | 15 | 190 | −11.0 |
| 39 | 20 | 250 | −23.0 |

*Table X*

ORIENTED FILMS

[Blends of Table IX + 5% dibutyl sebacate plasticizer]

| Sample No. | Percent copolymer | Percent T Visible Range | ΔT Yellow | $O_2$ Trans. | WVTR | Cold Flex |
|---|---|---|---|---|---|---|
| 40 | 0 | 89.5 | 2.9 | 3.8 | 0.5 | 1 |
| 41 | 5 | 84.8 | 9.0 | 7.1 | 1.0 | 2 |
| 42 | 10 | 87.3 | 5.5 | 18.4 | 1.7 | 3 |
| 43 | 15 | 88.9 | 4.8 | 40.0 | 2.9 | 5 |
| 44 | 20 | 90.1 | 4.1 | 49.5 | 4.0 | 8 |

EXAMPLE 2

Latexes composed of 85% vinylidene chloride–15% vinyl chloride, 80% vinylidene chloride–20% vinyl chloride, and 73% vinylidene chloride–27% vinyl chloride were prepared as in Example 1. A rubbery copolymer of 70% butadiene–30% methyl isopropenyl ketone was prepared as in Example 1 and unplasticized moldings were formed as in Example 1 containing various proportions of the rubbery copolymer. The following table presents the data:

*Table XI*

| Composition of Vinylidene Chloride Copolymer (Percent Vinylidene Chloride) | Percent 70/30 Rubber Comp. | Flex. Mod. ×10⁵ at 0°C (p.s.i.)[1] | Cold Point,[2] °C. | Melt Viscosity Poise |
|---|---|---|---|---|
| 85 | 0 | 5.7 | 22 | 165,000 |
| 85 | 10 | 1.7 | 19 | 135,000 |
| 85 | 20 | 0.8 | 15 | 185,000 |
| 85 | 30 | 0.6 | 13 | 250,000 |
| 80 | 0 | 4.1 | 21 | 110,000 |
| 80 | 10 | 1.6 | 15 | 85,000 |
| 80 | 20 | 0.7 | 19 | 145,000 |
| 80 | 30 | 0.3 | 11 | 320,000 |
| 73 | 0 | 3.2 | 17 | 125,000 |
| 73 | 10 | 1.4 | 12 | 115,000 |
| 73 | 20 | 0.6 | 3 | 164,000 |
| 73 | 30 | 0.3 | −11 | 400,000 |

[1] Flexural Modulus at 0° C., the actual modulus p.s.i. at 0° C.
[2] Cold Point is the first large change in the slope of the flexural modulus vs. temperature curve as the temperature decreases from +50° C.

From the data presented, it can be seen that the addition of the indicated amounts of the specified elastomeric polymers to the normally crystalline vinylidene chloride copolymers results in blends having appreciably enhanced physical properties over the vinylidene chloride copolymers whether plasticized or unplasticized and whether stabilized or unstabilized. With regard to the latter, a composition was prepared by intimately blending 10% by weight of a copolymer of 70% butadiene and 30% methyl isopropenyl ketone with 90% of a copolymer of 73% vinylidene chloride and 27% vinyl chloride. This blend was fabricated by thermal extrusion without further plasticization or stabilization into an oriented film. The properties of this film showed about the same magnitude improvement over an unblended vinylidene chloride copolymer film as is evidenced in the foregoing examples.

From all of the above data it can be seen that incorporation of the butadiene methyl isopropenyl copolymers into normally crystalline vinylidene chloride polymers produces most favorable films and other articles for low temperature utility while retaining the desirable physical characteristics of those vinylidene chloride polymers.

We claim:

1. A polymeric composition comprising a blend of (I) from 70 to 95% by weight of the composition of a normally crystalline polymer selected from the group consisting of polyvinylidene chloride and interpolymers of at least about 70% by weight of vinylidene chloride with up to about 30% by weight of at least one other monoethylenically unsaturated comonomer and (II) complementarily from 5 to 30% by weight of the composition of a rubber-like copolymer consisting of (1) from 70 to 95% by weight of open chain aliphatic conjugated diolefin having from 4 to about 9 carbon atoms and (2) 5 to 30% by weight of a lower alkyl-lower alkenylketone.

2. The composition as claimed in claim 1 wherein said normally crystalline polymer is a copolymer of vinylidene chloride and vinyl chloride.

3. The composition as claimed in claim 2 wherein said normally crystalline polymer is a copolymer of 73% by weight of vinylidene chloride and 27% by weight of vinyl chloride.

4. The composition as claimed in claim 1 wherein said rubber-like copolymer is a copolymer of butadiene and methyl isopropenyl ketone.

5. The composition as claimed in claim 1 containing from 2 to 10% by weight of the composition of a plasticizer for a crystalline vinylidene chloride polymer.

6. The composition as claimed in claim 5 wherein said plasticizer is dibutyl sebacate.

7. The composition as claimed in claim 1 wherein said composition contains an antioxidant.

8. The composition as claimed in claim 7 wherein said antioxidant is 2,4-dimethyl-6-(1-methylcyclohexyl)-phenol.

9. A polymeric composition comprising a blend of (I) from 70 to 95% by weight of the composition of a normally crystalline polymer selected from the group consisting of polyvinylidene chloride and copolymers of at least about 70% by weight of polyvinylidene chloride with up to about 30% by weight of vinyl chloride and (II) from 5 to 30% by weight of the composition of a rubber-like copolymer consisting of (1) from 70 to 95% by weight of butadiene and (2) 5 to 30% by weight of methyl isopropenyl ketone.

10. The composition as claimed in claim 9 containing from 2 to 10% by weight of the composition of dibutyl sebacate.

11. An oriented film having improved flexibility at temperatures below 32° F. composed of a homogeneous blend of (I) from 70 to 95% by weight of the film of a normally crystalline polymer selected from the group consisting of polyvinylidene chloride and interpolymers of at least about 70% by weight of vinylidene chloride with up to about 30% by weight of at least one other monoethylenically unsaturated comonomer and (II) from 5 to 30% by weight of the film of a rubber-like copolymer consisting of (1) from 70 to 95% by weight of a conjugated diolefin and (2) 5 to 30% by weight of a lower alkyl-lower alkenyl-ketone.

12. The oriented film claimed in claim 11 wherein said monoethylenically unsaturated comonomer is vinyl chloride.

13. A molded article composed of a homogeneous blend of (I) from 70 to 95% by weight of the article of a normally crystalline polymer selected from the group consisting of polyvinylidene chloride and interpolymers of at least about 70% by weight of vinylidene chloride with up to about 30% by weight of at least one other monoethylenically unsaturated comonomer and (II) from 5 to 30% by weight of the article of a rubber-like copolymer consisting of (1) from 70 to 95% by weight of a conjugated diolefin and (2) 5 to 30% by weight of a lower alkyl-lower alkenyl-ketone.

14. A molded article claimed in claim 13 wherein said monoethylenically unsaturated comonomer is vinyl chloride.

References Cited in the file of this patent
UNITED STATES PATENTS

| | | |
|---|---|---|
| 2,469,721 | Gidley | May 10, 1949 |
| 3,005,796 | Dreisbach | Oct. 24, 1961 |
| 3,033,812 | Isaccs et al. | May 8, 1962 |

OTHER REFERENCES

Buttrey: Plasticizers, Franklin Publishing Co., New Jersey, chapter 4, p. 76, 1960.

Miall: A New Dictionary of Chemistry, Interscience Publishers Inc., New York, p. 48, 1961.